United States Patent
Baldi et al.

(10) Patent No.: US 7,255,046 B2
(45) Date of Patent: Aug. 14, 2007

(54) METHOD AND APPARATUS FOR USE IN GUIDING MAGNETICALLY LEVITATED VEHICLES

(75) Inventors: Robert W. Baldi, San Diego, CA (US); Husam Gurol, Carlsbad, CA (US); Robert Kratz, San Diego, CA (US)

(73) Assignee: General Atomics, San Diego, CA (US)

( * ) Notice: Subject to any disclaimer, the term of this patent is extended or adjusted under 35 U.S.C. 154(b) by 0 days.

(21) Appl. No.: 10/898,651

(22) Filed: Jul. 23, 2004

(65) Prior Publication Data

US 2006/0016365 A1    Jan. 26, 2006

(51) Int. Cl.
*B60L 13/04* (2006.01)
(52) U.S. Cl. ..................................... 104/281
(58) Field of Classification Search ............... 104/281, 104/282, 283
See application file for complete search history.

(56) References Cited

U.S. PATENT DOCUMENTS

| | | | |
|---|---|---|---|
| 5,722,326 A | 3/1998 | Post | |
| 5,868,077 A * | 2/1999 | Kuznetsov | 104/281 |
| 6,418,857 B1 * | 7/2002 | Okano et al. | 104/281 |
| 6,629,503 B2 * | 10/2003 | Post | 104/281 |
| 6,664,880 B2 | 12/2003 | Post | |
| 6,758,146 B2 * | 7/2004 | Post | 104/281 |

OTHER PUBLICATIONS

Post, Richard E., "Maglev: A New Approach", Scientific American, Jan. 2000, 9 pages.

* cited by examiner

*Primary Examiner*—S. Joseph Morano
*Assistant Examiner*—Robert J. McCarry, Jr.
(74) *Attorney, Agent, or Firm*—Fitch, Even, Tabin & Flannery (57) ABSTRACT

The present embodiments provide methods and apparatuses for use in controlling and directing magnetically levitated vehicles. In some embodiments, a method propels or passes a vehicle along a guideway, magnetically levitates the vehicle as it travels along the guideway, and induces a magnetic drag on the vehicle as it travels along a portion of the guideway. The magnetic drag can be induced by passing the magnet proximate a plate of conductive material. The plate can be positioned on a first side of the vehicle to induce the magnetic drag resulting in a force on the vehicle in a direction toward the first side. The method can further induce the magnetic drag to guide the vehicle along a curve of the guideway, where the plate is positioned on an inward side of the curve such that the force directs the vehicle into the curve.

30 Claims, 8 Drawing Sheets

METHOD AND APPARATUS FOR USE IN GUIDING MAGNETICALLY LEVITATED VEHICLES

The United States Government may have rights in some embodiments described herein pursuant to Cooperative Agreement No. CA-26-7025 between the United States Federal Transportation Administration and General Atomics.

FIELD OF THE INVENTION

The present embodiments provide methods and systems for use in controlling magnetically levitated vehicles, and more particularly to controlling and guiding the levitated vehicles.

BACKGROUND

The concept of magnetically levitated vehicles, such as trains, has suggested many benefits and advantages. Early implementations of magnetically levitated vehicles, however, have failed to achieve many of these advantages. Some of the drawbacks of many magnetically levitating vehicle systems include the cost in constructing, maintaining and operating these systems.

Recent developments have provided some significant improvements over earlier systems. One of these improvements includes the use of Halbach arrays. The increased magnetic field and the simplified guideway or track configurations that can be utilized with the Halbach arrays greatly reduce costs and complexity.

The use of Halbach arrays allow vehicles to travel at significant speeds. The guideways, however, must still be precisely designed to compensate for small construction defects that can adversely affect the ride of the vehicle. Further, navigating turns and curves along the guideways introduces some problems in design and construction that can require added complexity and/or increased costs.

SUMMARY

The present embodiments advantageously address the needs above as well as other needs by providing methods and apparatuses for use in controlling and/or directing magnetically levitated vehicles, such as trains, cars, and/or other such vehicles. In some embodiments, a method is provided for use in guiding a vehicle. The method passes a magnet along a guideway, magnetically levitates the magnet as the magnet travels along the guideway, and induces a magnetic drag on the magnet as the magnet travels along a portion of the guideway. In some preferred embodiments, the magnet is incorporated into a vehicle, and the vehicle is magnetically levitated as it passes along the guideway. The magnetic drag is induced, in some implementations, by passing the magnet proximate a plate of conductive material. The method can further control the vehicle, in part, by positioning the magnet near a first side of the vehicle and inducing the magnetic drag on the magnet to further induce a force on the vehicle in a direction toward the first side of the vehicle. The method can further induce the magnetic drag to guide the vehicle along a curve of the guideway. In some embodiments, the magnetic drag is induced to generate a force on the vehicle in a direction toward a first side of the vehicle and into the curve.

Some embodiments provide a method for use in controlling a vehicle. The method magnetically levitates a vehicle, propels the magnetically levitated vehicle along a guideway, and induces a magnetic drag on the vehicle along a portion of the guideway. The magnetic drag in some implementations can induce eddy currents along the portion of the guideway that interferes with a levitation force. The eddy currents can be induced by passing at least some magnets of the vehicle proximate a plate of conductive material. In some embodiments, the induced magnetic drag is induced only on one side of the vehicle such that the vehicle is directed in a direction toward the one side of the vehicle. Inducing the magnetic drag on one side of the vehicle can, in some implementations, be utilized with a curved section of the guideway, where the conductive plate is positioned at least partially within the curved section. Further, the conductive plate is positioned on an inward side of the curve such that the force is radially inward to the curve.

An apparatus for use in guiding a vehicle is provided in some embodiments. The apparatus includes a guideway, a vehicle positioned on the guideway to travel along the guideway, where the vehicle includes at least one magnet, and a conductive plate positioned proximate the guideway and along a portion of the guideway, such that an eddy current is induced in the conductive plate as at least one magnet of the vehicle passes the conductive plate inducing a drag force on the magnet that is transferred to the vehicle. In some preferred embodiments, the guideway includes first and second track array, and the conductive plate is positioned on the first side of the guideway, such that the drag force further induces a force on the vehicle in a direction generally toward the first side and generally away from the second side of the guideway. The conductive plate can be positioned at a curved section to aid in guiding the vehicle along the curve. Further, the conductive plate is positioned, in some implementations, along the first track array where the first track array is on an inward side of the curved section inducing a force on the vehicle that is generally radially inward to the curve to guide the vehicle along the curve. In some embodiments, the conductive plate tapers along at least a portion of a length of the conductive plate, additionally and/or alternatively, the conductive plate can comprise an aluminum and/or copper alloy. Further, the conductive plate can be constructed of a plurality of layers of materials, such as copper, aluminum, stainless steel, and other similar materials and combinations of materials.

In another embodiment, an apparatus for use in controlling a vehicle is provided. The apparatus includes a guideway that comprises a series of current carrying rungs, a magnet that is positioned adjacent the guideway such that the magnet travels along the guideway, and a means for inducing a drag on the magnet as the magnet travels along the guideway, where the means for inducing the drag is positioned proximate a plurality of the rungs. In some embodiments, the means for inducing the drag includes an electrically conductive plate positioned proximate the plurality of rungs. Typically, the conductive plate is positioned between the plurality of rungs and the magnet as the magnet travels along the guideway.

Still other embodiments provide an apparatus for levitating vehicles. These embodiments can include a guideway comprising a first array of generally parallel rungs that are positioned perpendicular to the guideway. The rungs include electrically conductive material in which a current can flow. A conductive plate is further positioned along a portion of the guideway, proximate a series of rungs. In some embodiments, a current flows in the electrically conductive material of the rungs as a magnet passes proximate the rungs generating a magnetic force. Further, the conductive plate generates an eddy current as the magnet passes proximate the conductive plate such that the eddy current induces a magnetic drag on the magnet. Still further, the conductive plate is typically positioned between the rungs and the magnet such that the eddy currents further reduce the magnetic lift force applied from the rungs on the magnet. In some embodiments, the guideway comprises a sheet or sheets of copper or other conductive material that are laminated, typically with insulating bonding material, to form an inexpensive and mechanically strong structure. The laminate is further cut or etched to form slots or slits in the laminate. The slots or slits define current paths or "rungs". In some embodiments, the rungs are constructed of packed bundles of insulated wire.

BRIEF DESCRIPTION OF THE DRAWINGS

The above and other aspects, features and advantages of the present embodiments will be more apparent from the following more particular description thereof, presented in conjunction with the following drawings wherein.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The present embodiments provide methods, apparatuses and systems for use in guiding magnetically elevated vehicles, such as trains, cars and other such vehicles, and/or other magnetically elevated objects. Typically, magnetically elevated vehicles travel along a guideway or track on which the vehicle follows. Further, the magnetic lift is achieved through the interaction with the guideway. In some embodiments, the vehicle includes one or more magnets that induce a current in portions of the guideway resulting in a magnetic force on the magnets causing the vehicle to lift from the guideway ("electrodynamic suspension"). In other implementations, magnetic attraction forces are utilized to elevate the vehicle or other object ("electromagnetic suspension").

Figure 1:
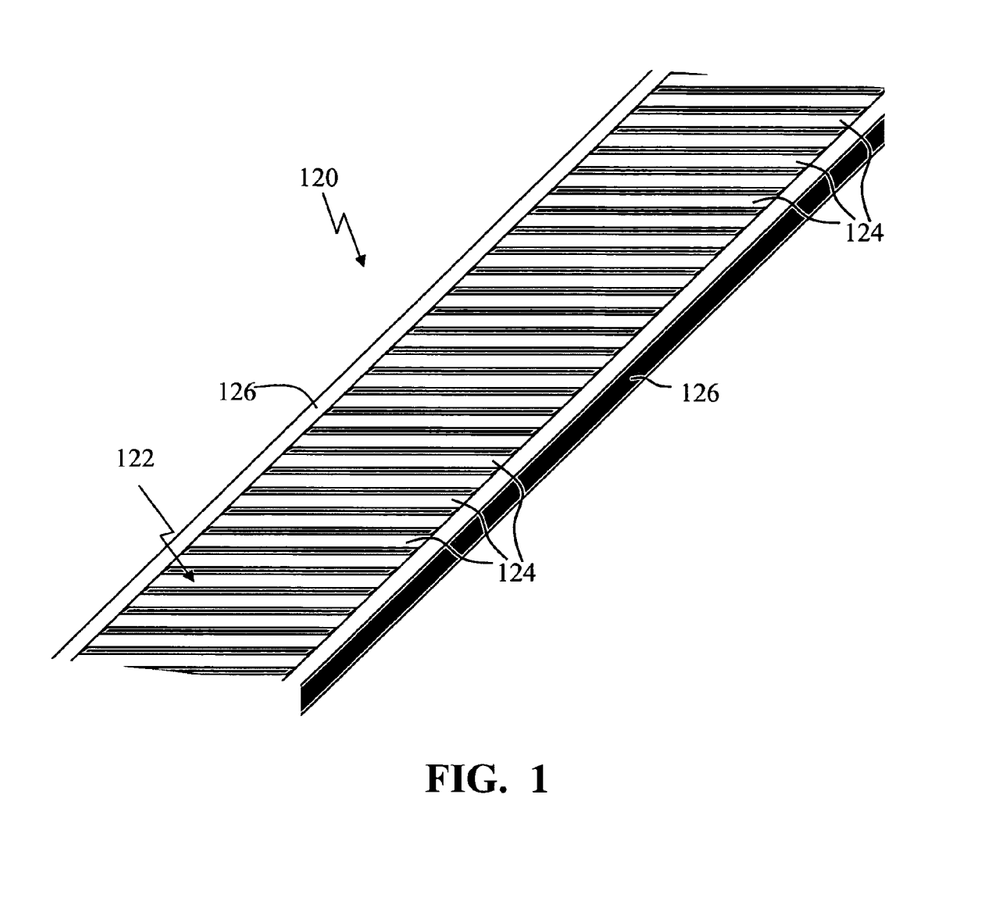
FIG. 1 depicts a simplified diagram of a guideway according to some present embodiments.

FIG. 1 depicts a simplified diagram of a guideway 120 according to some present embodiments. The guideway includes a levitation track array 122 that comprises a series of rungs 124. In some embodiments, the levitation array has a ladder like construction with the rungs 124 closely spaced. The rungs, in some embodiments, comprise tightly packed bundles of insulated wire 226 (see FIG. 2), sometimes referred to as Litz wire or cable. The Litz wire comprises, in some preferred implementations, many strands of insulated wire that are specially transposed so that each wire visits the inner and outer parts of the cable structure equally. In this way skin effects are substantially circumvented and the current is generally uniformly distributed throughout the cable. The conductors of each rung 124 are connected at both ends into a common bus bar 126, thereby forming an array of short circuits.

Figure 2:
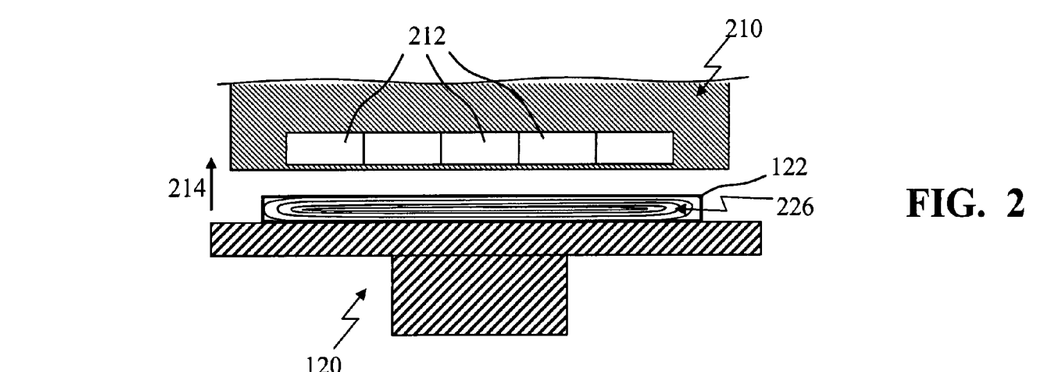
FIG. 2 depicts a simplified cross-sectional view of a vehicle positioned over the guideway of FIG. 1.

FIG. 2 depicts a simplified cross-sectional view of a vehicle 210 (such as a train) positioned over a guideway 120. The vehicle, in some preferred embodiments, includes a plurality of permanent magnets 212 arranged in a Halbach array. Other types of magnets and other configurations can be employed with other embodiments. For example, some embodiments utilize electromagnetic, superconducting magnets and other magnetic configurations. As the vehicle and/or magnets travel over the rungs 122, the magnets induce electrical currents in the wiring 226 of the rungs. These currents produce a magnetic field, indicated by the arrow labeled 214, that repels the array of magnets 212, thus levitating the vehicle. This repulsive force 214 lifts or levitates the vehicle to hover over the guideway as the vehicle is moved over the rungs. The amount of lift achieved depends on many factors, including the types, sizes, and strengths of magnets used, the proximity of the magnets to the rungs, the size of the rungs, the size of the wiring in the rungs, the speed of the vehicle and other such factors, and implementations can be employed to achieve a desired amount of lift. In some implementations, the vehicle is levitated about one inch, however, other distances of levitation can be achieved by varying the parameters.

Figure 3:
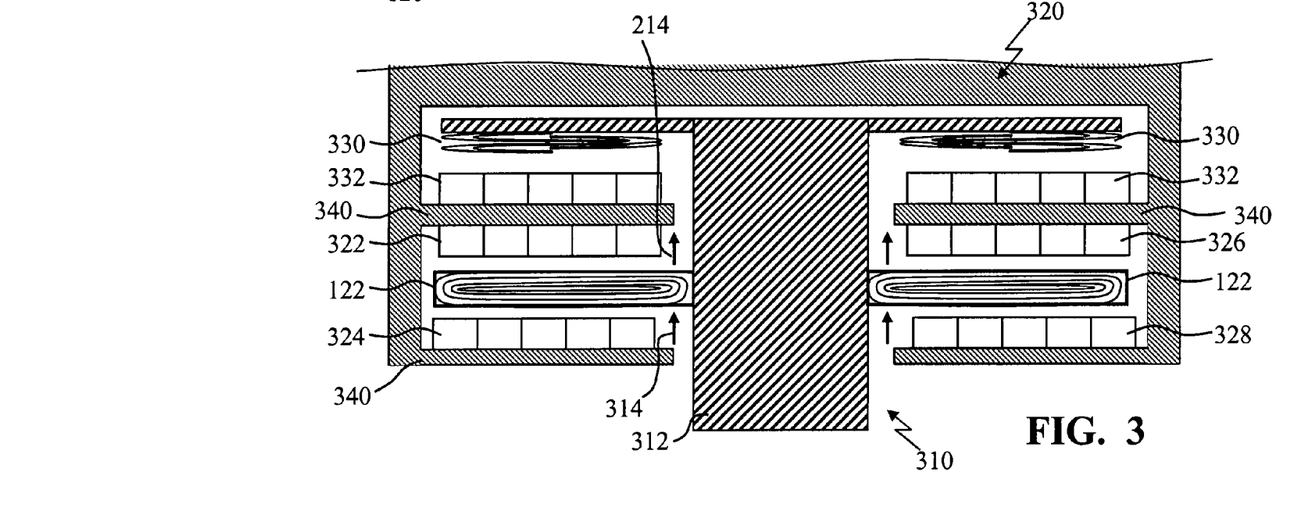
FIG. 3 depicts a simplified cross-sectional view of an alternate embodiment of a guideway and vehicle according to some preferred embodiments.

FIG. 3 depicts a simplified cross-sectional view of an alternate embodiment of a guideway 310 and vehicle 320 according to some preferred embodiments. The guideway 310 includes two levitation track arrays 122 separated by a distance. The levitation track arrays are supported by a support post 312 and/or other structure. The vehicle 320 includes two dual Halbach arrays secured with the extension arms 340 of the vehicle. Each of the dual Halbach arrays comprise two Halbach arrays 322, 324, and 326, 328 positioned proximate one of the two levitation track arrays 122. The dual Halbach arrays straddle the levitation arrays 122. The Halbach arrays (in some implementations upper Halbach arrays 322, 326 and lower Halbach arrays 324, 328) induce a magnetic repulsion force 214. As such, the dual Halbach arrays provide a nearly doubling of the magnetic field. Further, the induced current in the wiring of the rungs 124 is also reduced by about half while still achieving substantially the same magnetic force per unit area as the embodiments using a single Halbach array positioned proximate the levitation array 122. Still further, the same magnetic force is generated through the dual Halbach arrays straddling the levitation arrays without substantially increasing the weight or foot print area of the Halbach arrays. The straddled, dual Halbach array configuration additionally results in a reduced magnetic drag force, providing greater levitation efficiency, at lower speeds than the single Halbach array configuration.

Still referring to FIG. 3, some preferred embodiments, further utilize magnetic force as a driving force on the vehicle 320 to propel the vehicle along the guideway. In some of these embodiments, the guideway 310 further includes motor windings 330 distributed along the guideway. The vehicle 320 can further include an additional set of driving magnets 332, and in some implementations, these driving magnets are also configured in a Halbach array. The motor windings 330 can be coupled with a synchronous motor (not shown) to drive and brake the vehicle. The current alternately passing through the motor windings 330 to generate a magnetic force that pulls and/or pushes the driving Halbach array 332 and thus propels the vehicle. The motor windings 330 provide precise control of speed for the vehicle.

The present embodiments provide added control over the vehicle, improve guidance along the guideway, and can improve the overall ride quality of the vehicle along the guideway. This added control, guidance and improved ride quality is achieved, at least in part, by inducing drag on the vehicle as it travels along the guideway. In some preferred embodiments, the drag is a magnetically induced drag.

Figure 4:
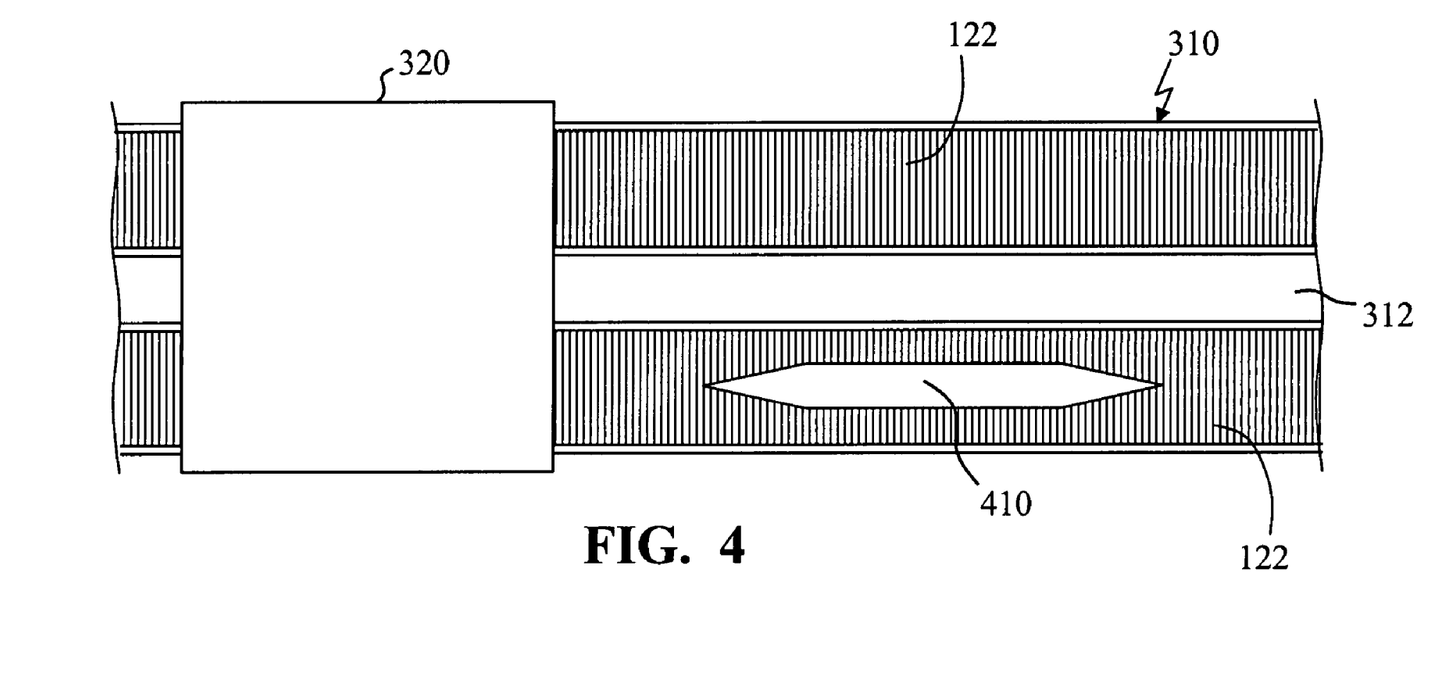
FIG. 4 depicts a simplified diagram, overhead view, of the guideway of FIG. 3 with a vehicle traveling along the guideway.

FIG. 4 depicts a simplified diagram, overhead view, of a guideway 310 comprising multiple track arrays 122 (e.g., two track arrays 122 are illustrated supported by a support post 312) with a vehicle 320 traveling along the guideway. A plate and/or sheet 410 of electrically conductive material is positioned along a section of one of the track arrays 122. As the magnets (e.g., magnets 322 of FIG. 3) of the vehicle pass proximate to and/or over the plate 410, eddy currents are induced in the plate. These eddy currents interfere with and/or counter at least some of the magnetic lift force caused by the current passing through the rungs of the guideway. Further, the eddy currents induce a drag on the propulsion of the vehicle 320 along the guideway 310. One or more drag plates can be positioned on one or both of the track arrays 122 depending on the implementation and the desired drag forces as described below. Further, the drag plate or plates 410 can be posited on a top of the array and/or a bottom of the array to achieve the desired magnetic drag effect.

Typically the plate 410 comprises one or more layers of electrically conductive material. For example, some embodiments employ a plate of aluminum and/or aluminum alloy having a predefined thickness and dimensions to achieve a desired drag. In some implementations for example, a sheet of 6061 aluminum with a thickness of about 5 mm can be used. The plate 410 can be constructed of substantially any relevant conductive material including, but not limited to, copper, aluminum, steel, and other such relevant material. Similarly, the plate can be constructed of alloys, combinations of materials, and/or multiple layers of conductive materials to achieve the desired drag.

Figure 5:
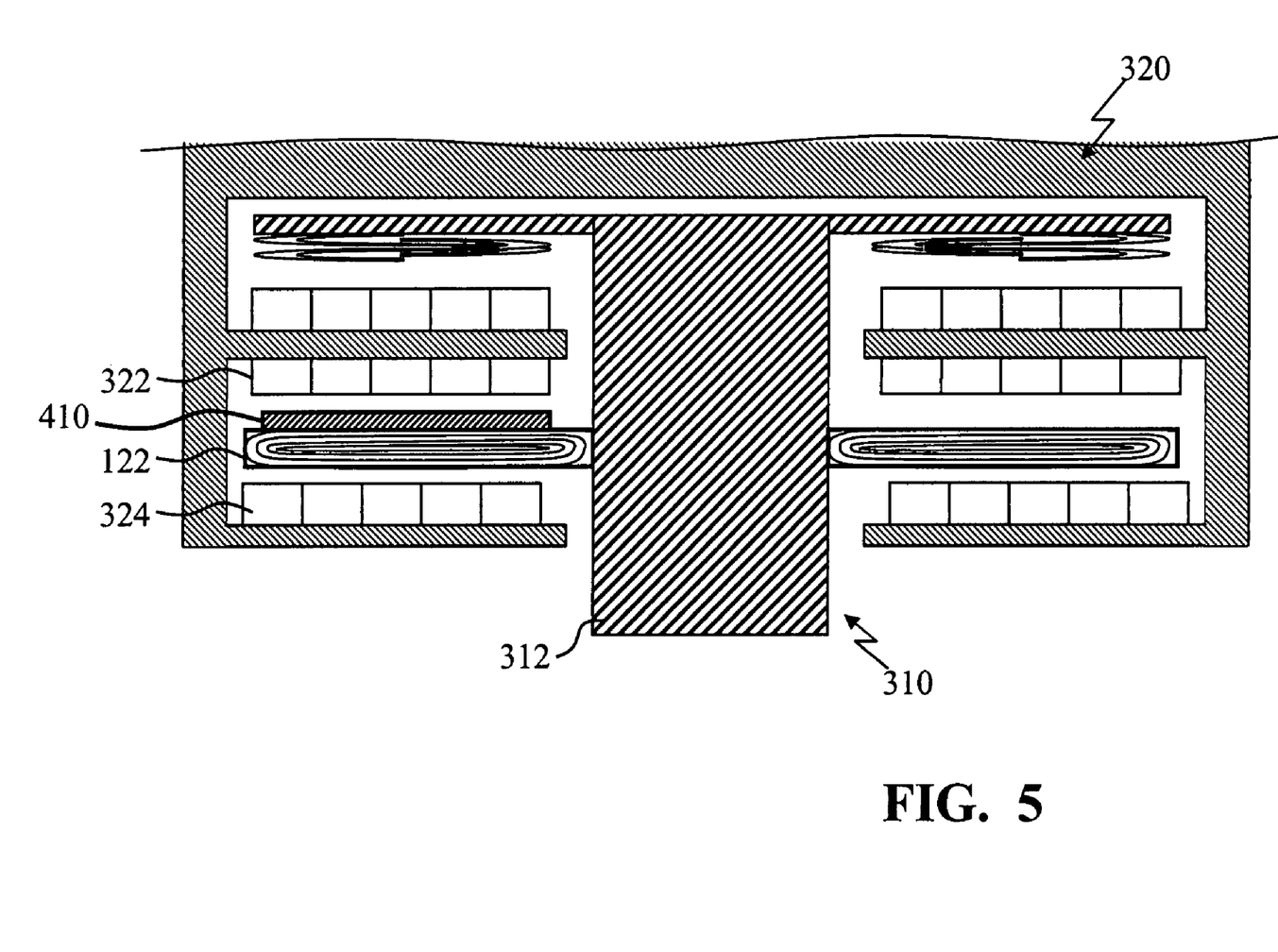
FIG. 5 depicts a simplified cross-sectional view of a guideway and a vehicle traveling along the guideway with a plate and/or sheet of electrically conductive material positioned over one of the track arrays.

FIG. 5 depicts a simplified cross-sectional view of the guideway 310 and the vehicle 320 according to some preferred embodiments with a plate and/or sheet 410 of electrically conductive material positioned over one of the track arrays 122. In some implementations, a drag plate 410 can be positioned on both track arrays. As the magnets (for example, magnets 322) of the vehicle pass proximate to and/or over the plate 410, eddy currents induced in the plate interfere with at least some of the magnetic lift force and induce an additional magnetic force drag that is opposite to the direction of travel.

Figure 6:
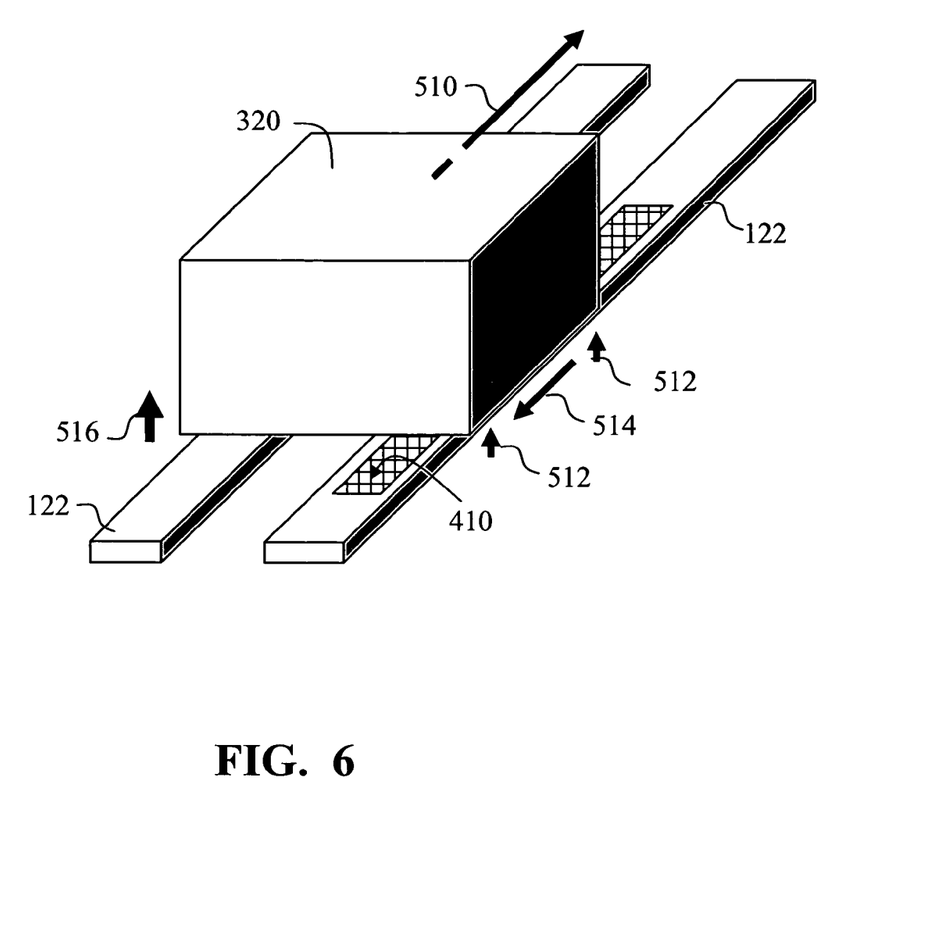
FIG. 6 depicts a simplified diagram demonstrating forces on a vehicle as the vehicle travels in a direction and passes over a drag plate positioned on one of two track arrays.

FIG. 6 depicts a simplified diagram demonstrating forces on a vehicle 320 as the vehicle travels in a direction 510 and passes over a drag plate 410 positioned on one of the track arrays 122. As the magnets of the vehicle pass over the plate, eddy current(s) are induced in the plate causing a reduced magnetic lift 512 by a predefined amount. Additionally, the eddy currents in the conductive plate further induce a drag force 514 that is typically opposite to the direction of travel 510. The reduced lift 512 and/or enhanced drag force 514 is dependent on the speed of the vehicle, the size and magnetic field generated by the magnets of the vehicle, the thickness and dimensions of the plate, the dimensions of the plate relative to the size of the guideway (and/or rungs), and other such parameters. Typically, these parameters can be controlled, and thus the amount of reduced lift 512 and/or drag 514 is at least approximately known and can be controlled. When the guideway includes two track arrays 122, and a drag plate 410 is only positioned on one track array, one side of the vehicle experiences the reduced lift 512 while the other side maintains substantially the original magnetic lift 516.

The induced drag force 514 can be utilized in further controlling the speed of the vehicle, dampen inconsistencies and/or flaws in the guideway and other effects. The drag plates 410 provide passive control of the vehicle, including passively reducing lift and increased drag to guide the vehicle in local regions of the guideway. This passively induced drag does not require system control to implement the drag. Because a vehicle's speed, approximate weight, amount of magnetic force and other parameters are generally know, the amount of drag can, in some preferred embodiments, be precisely anticipated allowing a plate to be designed to induce a precise amount of drag 514.

The present embodiments further induce drag on the vehicle to aid in guiding a vehicle around a curve, bend or turn in the guideway. In many implementations of a guideway, the guideway includes curves and turns along predefined paths. As the vehicle approaches these curves and/or turns, typically the speed of the vehicle is reduced depending on the radius of the curve, the location of the center of gravity of the vehicle, the height of the vehicle, and/or other such factors. Some preferred embodiments additionally induce a drag on the vehicle to aid in navigating the curve. Still further, some embodiments avoid the need of reducing the speed, or decreasing the amount by which the speed is reduced by inducing drag on the vehicle.

Figure 7:
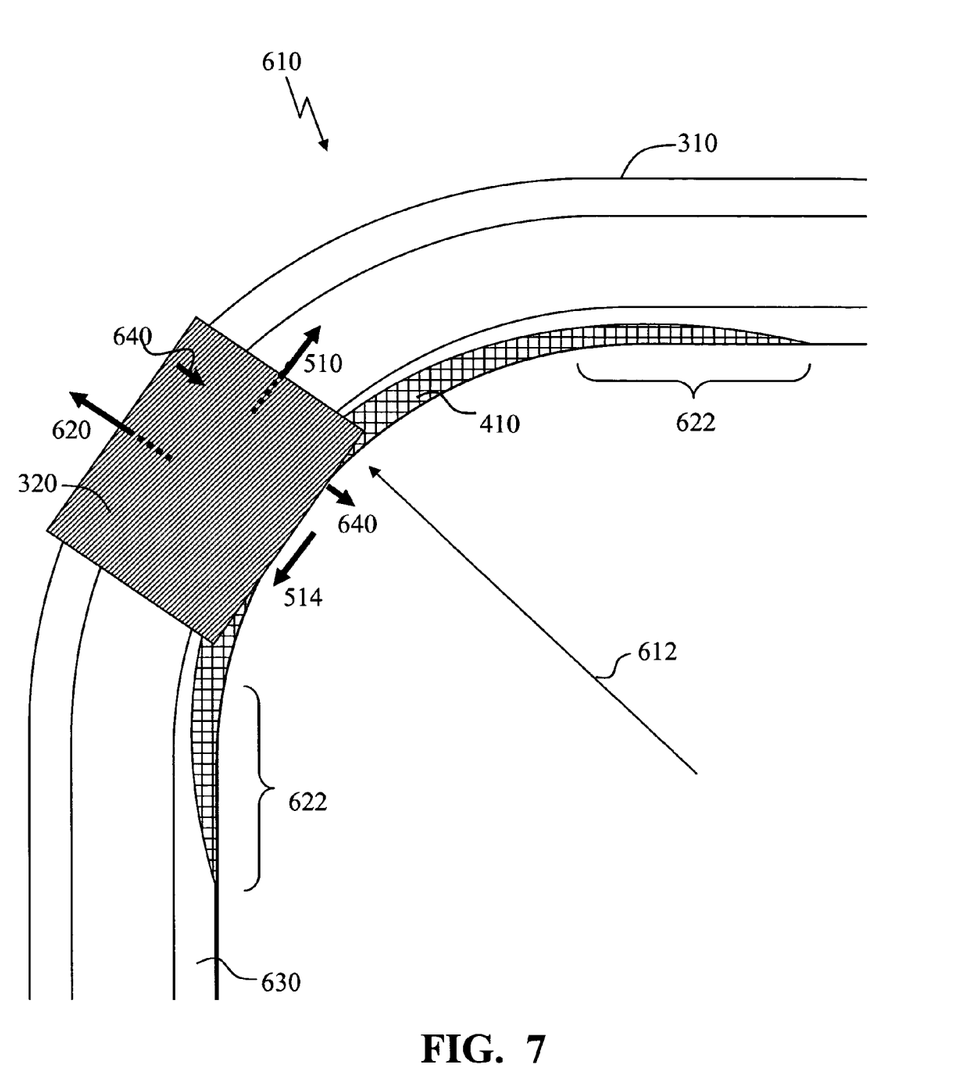
FIG. 7 depicts a simplified diagram, overhead view, of a curved portion of a guideway with a vehicle traveling along the curve of guideway.

FIG. 7 depicts a simplified block diagram, overhead view of a guideway 310 with a vehicle 320 traveling along the guideway. The portion of the guideway shown in FIG. 7 includes a curve 610 that has generally a radius of curvature defined by reference number 612. As the vehicle passes around the curve 610, the vehicle has a momentum and propulsion force in the direction of travel 510 entering the curve. Similarly, as the vehicle 320 passes around the curve, a centrifugal force 620 is induced on the vehicle that is generally opposite the radius of the curve. This centrifugal force must be overcome by the magnetic pull induced through the guideway.

Some preferred embodiments additionally induce a drag 514 on the vehicle 320 to reduce the momentum and at least partially counter the centrifugal force 620. Still referring to FIG. 7, one or more drag plates 410 can be mounted and secured with the inboard track array 630 of the guideway 310. As the vehicle passes over the inboard drag plate 410, a drag 514 is induced on one side (the inboard side) of the vehicle, while the outboard side does not experience the drag. By inducing a drag on the inboard side of the vehicle while maintaining the same propulsion on the outboard side, a force 640 is created by the vehicle pulling the vehicle toward the inbound side and the outboard side of the vehicle further pushes the vehicle into the curve. As a result, the induced drag induces a force on the vehicle that aids in guiding the vehicle around the curve.

As introduced above, the velocity of the vehicle and the curvature of the guideway are typically known. Because the planned velocity profile along the guideway is known, a prescribed amount of drag can be induced to aid in steering the vehicle into the curved section 610 of the guideway. Similarly, the drag can be used to compensate for construction tolerance imperfections along substantially any section of the guideway.

Further, the drag plate 410 can also be positioned and have sufficient dimension to reduce the magnetic lift 412 (see FIG. 5) on the inboard side of the vehicle 320, while the magnetic lift on outbound side of the vehicle is maintained at previous levels 516. The difference in lift between the inboard and outboard sides of the vehicle results in a slight tilt of the vehicle toward the inboard side. This tilt further aids in allowing the vehicle to navigate the curve 610.

The drag plate or plates 410 can be arranged in numerous configurations. In some preferred embodiments, the plate 410 is gradually introduced by tapering the plate from a minimum width to a maximum width in a transition region(s) 622. Similarly, the tapering can also be employed at a departure side of the plate such that the plate tapers from a larger width to a smaller width. This tapering allows the drag 514 to be gradually introduced and applied to the vehicle as well as gradually removing the drag, thus avoiding abrupt changes in the magnetic forces and smoothing the ride of the vehicle. The plate can be configured such that the tapering initiates (and/or terminates) near a side of the guideway, a center of the guideway, or substantially any location on the guideway. Additionally and/or alternatively, the drag plate can be assembled from a plurality of plates spaced along the guideway to induce the desired drag effect. The spacing, length, and/or width can be used to achieve the drag. The plate(s) 410 can have substantially any shape to achieve the desired drag.

The type of material used in manufacturing the plate, and the thickness, width and length of the plate can be varied to induce the desired drag force 514. Typically, the more conductive the material used in constructing the plate, the greater the induced drag. However, to achieve a desired drag, the plate 410 typically has to be able to withstand the reactive forces applied on it by magnetic forces from the vehicle, where the reactive forces are generally in a direction opposite to the drag and have substantially the same magnitude as the drag force induced on the vehicle. As such, thin sheets of conductive material alone, cannot in some implementations be used. Alternatively, thicker sheets of less conductive material can be used to achieve the same desired drag, while being thick enough to withstand the reactive forces. Additionally and/or alternatively, less conductive and/or nonconductive materials can be used in cooperation with thin highly conductive materials (e.g., copper) to provide the strength to withstand the reactive forces while achieving the desired drag forces 514 on the vehicle.

As discussed above, the drag plate 410 can include multiple layers. For example, in some embodiments, the drag plate includes a conductive central layer (such as copper, aluminum or other conductive material) sandwiched between two less conductive and/or nonconductive layers (such as steel, an aluminum alloy or other such less conductive and/or nonconductive material). The highly conductive layer produces the desired drag while the one or more external layers provide support to withstand the reactive forces.

Figure 8:
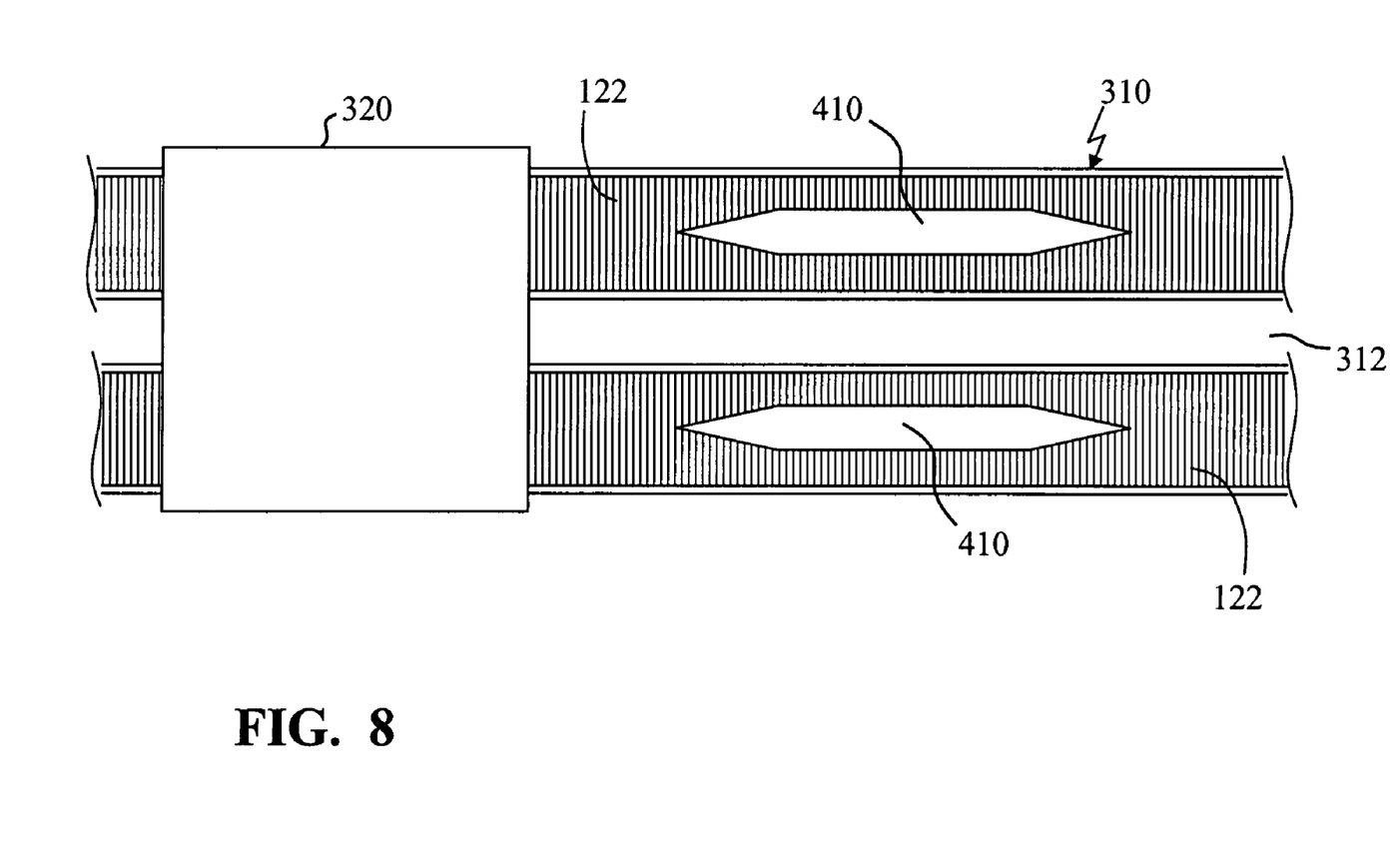
FIG. 8 depicts a simplified overhead view of a vehicle traveling along a guideway.

The drag plates can be positioned on one or both of the track arrays 122. FIG. 8 depicts a simplified overhead view of a vehicle 320 traveling along a guideway 310. The guideway includes two track arrays 122. A drag plate 410 is secured with each guideway. As the vehicle 320 passes over the drag plates, the magnetic drag is induced. Utilizing drag plates on both track arrays allows for additional control over the vehicle, allows for the compensation of construction defects and/or inconsistencies, and other benefits.

One or more drag plates 410 can advantageously be positioned on a guideway after the construction and assembly of the guideway. Positioning and securing the drag plate after the construction of the guideway provides numerous advantages. For example, the guideway does not need to be specifically designed to achieve the desired drag forces. A standard guideway can be constructed that is generally uniform, and the drag plates can later be added to achieve the desired drag force. Additionally, the drag plates allow for the compensation of some construction flaws. Further, the positioning of the plates after the construction of the guideway also allows for a simple and low cost implementation to induce the drag. Still further, the positioning of the plates after the construction of the guideway allows the plates to be adjusted and/or modified after installation without undue cost, time, and parts.

In some embodiments, the guideway can be constructed of slotted sheets of copper or other conductive materials laminated with insulating bonding material to form an inexpensive and mechanically strong structure. Slots or slits are cut into the laminate to define current paths or "rungs", similar to the paths defined by the rungs 124 of the ladder track array 122. The slit defined "rungs" provide magnetic forces that are similar to the magnetic forces provided by the Litz rungs as the vehicle with the magnetic arrays travels over the laminate guideway. The drag plates can equally be employed with a guideway of laminated sheets. An eddy current is similarly induced in the plate as the vehicle travels over the plate causing the desired drag force.

In some embodiments, the desired drag force can be induced by altering the guideway configuration instead of and/or in cooperation with the use of one or more drag plates. Additionally and/or alternatively, the rungs of the guideway can be altered, in some embodiments, during construction and/or assembly of the guideway to achieve the desired drag forces. For example, the number of windings and/or the material of the windings within a series of rungs can be altered for a predefined section of the guideway such that a reduced current is induced as the vehicle passes over these rungs, thus reducing the lift and inducing a drag. In other embodiments, the spacing between rungs and/or the size of rungs can be altered. Additionally and/or alternatively, rungs can be replaced with rungs of other materials, for example, solid rungs can be inserted in sections of the guideway to induce the drag. Other features can be employed to reduce current within a series of rungs to achieve a desired drag. Further, the alterations to the rungs can be implemented such that the induced drag is gradually introduced.

Similarly, some embodiments employing a laminated guideway comprising slotted sheets of copper or other conductive material can also be altered in predefined sections of a guideway relative to other portions of the guideway to induce the desired drag. For example, the spacing between the slots and/or the lengths of the slots can be altered to reduce the current flow between the slots of the predefined area of the guideway to reduce the lift and/or induce the desired drag.

Figure 9:
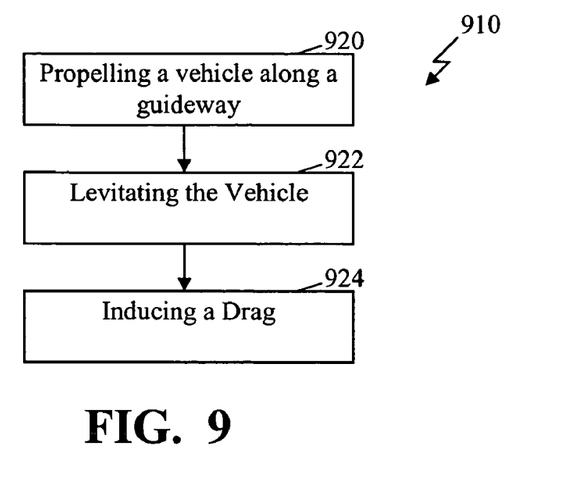
FIG. 9 depicts a simplified flow diagram of a process for use in inducing a drag on a vehicle as it travels along a guideway.

The utilization of an induced magnetic drag provided by the present embodiments allow for improved control and guidance of magnetically levitated vehicles. FIG. 9 depicts a simplified flow diagram of a process 910 for use in inducing a drag on a vehicle 320 as it travels along a guideway 310. In step 920, a vehicle that includes magnets (such as Halbach arrays, electromagnets, superconducting magnets, and other such magnets) is propelled along the guideway. In step 922, the vehicle is levitated once the vehicle attains a minimum levitation speed. In step 924, a designed magnetic drag is induced on at least some of the magnets of the vehicle. This drag can be induced for example, by passing the magnets proximate drag plate of conductive material, typically passing the magnets over and/or under the drag plate. In some alternative implementations, an amount of current within the guideway is limited along an area where the drag is induced to reduce the magnetic lifting force and inducing the drag.

Figure 10:
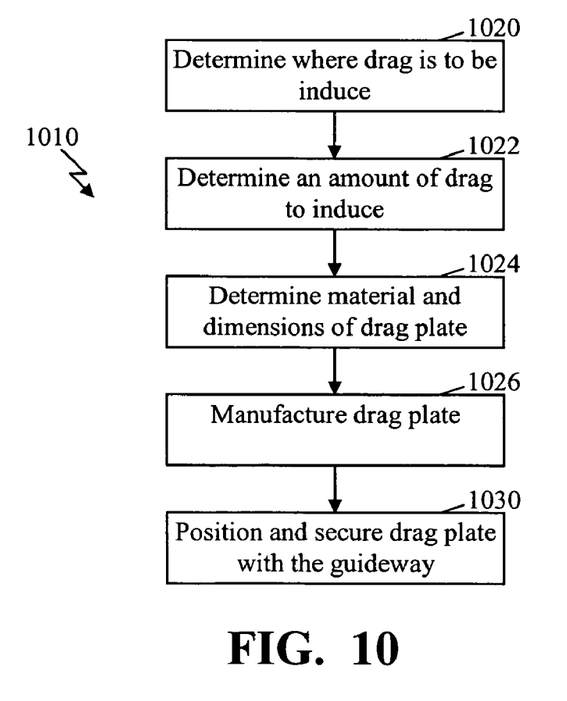
FIG. 10 depicts a simplified flow diagram of a process for use in determining and implementing a means for inducing a drag on a vehicle as it travels along a guideway.

FIG. 10 depicts a simplified flow diagram of a process 1010 for use in determining and implementing a means for inducing a drag on a vehicle as it travels along a guideway. In step 1020, it is determined where along the guideway a drag is to be induced, typically a magnetic drag. In step 1022, an amount of magnetic drag to be induced is determined. This can include knowing the expected speed of a vehicle, the configuration of the guideway (curved, straight, hill, construction defects, and other such conditions). The determination of the amount of induced drag further includes determining if drag is to be induced on both sides of a vehicle or only on one side.

In step 1024, the material, size, and shape of a drag plate are determined to achieve the desired drag. For example, the material may be an aluminum alloy, and may taper at both ends. In step 1026, the drag plate is manufactured according to the specifications determined in step 1024. In step 1030, the drag plate is positioned and secured along the guideway, and typically positioned above and/or below rungs of the guideway.

The present embodiments provide, at least in part, passive control for vehicles traveling along a guideway. Drag plates can be strategically placed to locally induce drag and reduce lift on the vehicle. In typical implementations, the planned velocity profile along the guideway is known. As a result, a prescribed amount of drag can be induced to help steer the vehicle into a curved section, to compensate for construction tolerance imperfections along any section of the guideway, to slow the vehicle, and provide other controls over the vehicle. The plates can be fabricated from a single type of conductive material, can be fabricated using multiple layers of different materials to provide, in some implementations, more precise control of the induced drag forces as a function of vehicle speed, and/or other configurations can be used in constructing the drag plates.

The induced magnetic drag provides passive control and/or passively improves ride quality and guidance. Further, the present embodiments can implement the drag plates after a guideway is constructed. The ability to employ the drag plate(s) after guideway construction simplifies the construction of the guideway, reduces planning complexity, and allows for easy implementation of the added control of the vehicle. Further, by installing the drag plates after construction of the guideway allows for easy modification of the guide plate(s) to optimize desired control.

While the invention herein disclosed has been described by means of specific embodiments and applications thereof, numerous modifications and variations could be made thereto by those skilled in the art without departing from the scope of the invention set forth in the claims.

What is claimed is:

1. A method for use in guiding a vehicle, comprising:
   passing a magnet along a guideway;
   magnetically levitating the magnet as the magnet travels along the guideway; and
   inducing an increase of magnetic drag on the magnet as the magnet travels along a predefined portion of the guideway in excess to magnetic drag experienced by the magnet as the magnet travels along the guideway.

2. The method of claim 1, wherein the passing the magnet along the guideway comprises passing the magnet fixed with a vehicle along the guideway such that the magnetically levitating the magnet comprises magnetically levitating the vehicle.

3. The method of claim 1, wherein the inducing the magnetic drag comprises passing the magnet proximate to a plate of conductive material having a defined length proportional to the predefined portion of the guideway.

4. The method of claim 3, wherein the magnet is positioned near a first side of a vehicle; and
   the inducing the increase of magnetic drag comprises inducing the additional magnetic drag on the magnet and inducing an additional force on the vehicle in a direction toward the first side of the vehicle as the magnet travels along the predefine portion of the guideway.

5. The method of claim 1, wherein the inducing the magnetic drag comprises inducing the magnetic drag and guiding the magnet along a curve of the guideway.

6. The method of claim 5, wherein the magnetically levitating the magnet comprises magnetically levitating the magnets secured with a vehicle such that the vehicle is levitated, and the inducing the magnetic drag comprises inducing the magnetic drag on the magnet and inducing a force on the vehicle in a direction toward the first side of the vehicle and into the curve.

7. The method of claim 4, wherein the magnetically levitating the magnet comprises magnetically levitating a plurality of magnets formed in Halbach arrays.

8. The method of claim 1, wherein the inducing the predefined increase of magnetic drag comprises inducing eddy currents along the predefined portion of the guideway reducing a propulsion force.

9. The method of claim 8, further comprising:
   positioning a plate of conductive material at the predefined portion of the guideway, such that the eddy currents are induced in the plate of conductive material.

10. The method of claim 1, wherein the inducing the predefined increase of magnetic drag comprises increasing the drag as the vehicle travels along a first predefined region of the predefined portion of the guideway and passively decreasing the magnetic drag as the vehicle travels along a second predefined region of the predefined portion of the guideway.

11. A method for use in controlling a vehicle, comprising:
    magnetically levitating a vehicle;

propelling the magnetically levitated vehicle along a guideway; and controlling movement of the levitated vehicle comprising:
inducing an increase in a magnetic drag on the vehicle along a predefined portion of the guideway in excess to magnetic drag experienced by the vehicle as the vehicle travels.

12. The method of claim 11, wherein the inducing the magnetic drag comprises inducing an eddy current along the portion of the guideway that reduces a propulsion force on the vehicle and interferes with a levitation force.

13. The method of claim 11, wherein the inducing a magnetic drag comprises passing the vehicle comprising a plurality of magnets secured with the vehicle along the predefined portion of the guideway such that at least some of the magnets pass proximate to a plate of conductive material.

14. The method of claim 13, wherein the passing at least some of the magnets comprises passing the at least some of the magnets proximate the conductive plate such that the at least some of the magnets are positioned on one side of the vehicle; and the inducing the increase in magnetic drag comprises inducing the increase in magnetic drag on one side of the vehicle generating an increased cumulative force on the vehicle that is directed sideways to a direction of travel such that the vehicle is directed in a direction toward the one side of the vehicle.

15. The method of claim 11, wherein the inducing the drag comprises inducing the drag on the vehicle along a first side of the vehicle; and directing the vehicle in a direction toward the first side of the vehicle.

16. The method of claim 11, wherein the inducing the drag comprises reducing the conductivity within a first series of rungs relative to a conductivity of a second series of rungs of the guideway.

17. The method of claim 11, wherein the inducing the increase in drag comprises increasing the drag as the vehicle travels along a first predefined region of the predefined portion of the guideway and decreasing the drag as the vehicle travels along a second predefined region of the predefined portion of the guideway.

18. An apparatus for use in directing a vehicle, comprising:
a guideway;
a vehicle positioned on the guideway to travel along the guideway, the vehicle comprising at least one magnet; and
a conductive plate having a predefined length and being positioned proximate the guideway and along a predefined portion of the guideway, such that an eddy current is induced in the conductive plate as the at least one magnet of the vehicle passes the conductive plate inducing an increased drag force on the magnet.

19. The apparatus of claim 18, wherein the conductive plate is positioned on a first side of the guideway, such that the drag force further induces a force on the vehicle in a direction generally toward the first side and generally away from a second side of the guideway.

20. The apparatus of claim 19, wherein the guideway includes a curved section, wherein the portion of the guideway at which the conductive plate is positioned is at least partially defined within the curved section.

21. The apparatus of claim 20, wherein the first side of the guideway is inward of the curve such that the force is generally radially inward to the curve.

22. The apparatus of claim 19, wherein the conductive plate tapers along at least a portion of a length of the conductive plate.

23. The apparatus of claim 19, wherein the conductive plate comprises aluminum alloy.

24. The apparatus of claim 19, wherein the conductive plate comprises layers of material.

25. An apparatus for use in guiding a vehicle, comprising:
a guideway comprising a plurality of current carrying rungs;
a magnet positioned adjacent the guideway such that the magnet travels along the guideway; and
a means for inducing an increase in magnetic drag on the magnet in excess of magnetic drag exerted on the magnet as the magnet travels along at least a portion of the guideway, where the means for inducing the drag is positioned proximate a plurality of the rungs.

26. The apparatus of claim 25, wherein the means for inducing the drag comprises an electrically conductive plate positioned proximate the plurality of rungs.

27. The apparatus of claim 26, wherein the plate is positioned between the plurality of rungs and the magnet as the magnet travels along the guideway.

28. The apparatus of claim 27, wherein the guideway comprises two substantially parallel track arrays; and
the plate is positioned proximate to one of the track arrays.

29. The apparatus of claim 28, wherein the guideway comprises a curve, and the plate is positioned proximate the first track array along the curve such that the drag induces a force on the magnet into the curve.

30. The apparatus of claim 25, wherein the inducing the drag comprises at least one of reducing current flow within a first series of rungs relative to a second series of rungs, increasing a separation distance between rungs for a first series of rungs relative to a separation between a fourth series of rungs, and reducing lengths of slits defining a fifth series of rungs relative to lengths of slits defining a sixth series of rungs.

* * * * *

UNITED STATES PATENT AND TRADEMARK OFFICE
CERTIFICATE OF CORRECTION

PATENT NO. : 7,255,046 B2  
APPLICATION NO. : 10/898651  
DATED : August 14, 2007  
INVENTOR(S) : Baldi et al.

Page 1 of 1

It is certified that error appears in the above-identified patent and that said Letters Patent is hereby corrected as shown below:

Column 11, line 7, delete "travels." and insert --travels along the guideway.--  
Column 12, line 49, delete "first" and insert --third--

Signed and Sealed this

Eighth Day of April, 2008

JON W. DUDAS  
*Director of the United States Patent and Trademark Office*